US008671016B2

(12) United States Patent
Little (10) Patent No.: US 8,671,016 B2
(45) Date of Patent: Mar. 11, 2014

(54) METHODS AND APPARATUS FOR ADVERTISING VIA COMPUTER NETWORKS AND WEBSITES

(75) Inventor: Chad Little, Phoenix, AZ (US)

(73) Assignee: eBay, Inc., San Jose, CA (US)

( * ) Notice: Subject to any disclaimer, the term of this patent is extended or adjusted under 35 U.S.C. 154(b) by 933 days.

(21) Appl. No.: 12/039,449

(22) Filed: Feb. 28, 2008

(65) Prior Publication Data

US 2008/0294523 A1    Nov. 27, 2008

Related U.S. Application Data

(60) Provisional application No. 60/891,995, filed on Feb. 28, 2007.

(51) Int. Cl.
  *G06Q 30/00* (2012.01)
  *G06Q 40/00* (2012.01)

(52) U.S. Cl.
  USPC .............................................. 705/14; 705/35

(58) Field of Classification Search
  USPC ....................................................... 705/14, 35
  See application file for complete search history.

(56) References Cited

U.S. PATENT DOCUMENTS 5,999,912 A    12/1999  Woodarz et al.
7,734,632 B2 *  6/2010  Wang ............................ 707/749
2003/0023481 A1 *  1/2003  Calvert et al. ................... 705/14
2003/0051171 A1 *  3/2003  Pearson ......................... 713/201
2005/0055269 A1 *  3/2005  Roetter et al. .................. 705/14

OTHER PUBLICATIONS

Business/Technology Editors; "New Software Suites from Engages to Increase Effectiveness of Multichannel Marketing and Advertising"; Business Wire; Jan. 29, 2001.*
Business_Wire; "SpecificMEDIA Launches Retargeting.com for Online Advertisers; Reports Higher Conversion Rates than Search Marketing"; Apr. 5, 2006.*
Hollis Thomases, "Retargeting Gains Traction, Part 1", The ClickZ Network, Apr. 25, 2006.

* cited by examiner

*Primary Examiner* — Edward Chang
(74) *Attorney, Agent, or Firm* — Schwegman, Lundberg & Woessner, P.A.

(57) ABSTRACT

Methods and apparatus for advertising according to various aspects of the present invention operate in conjunction with a retargeting system, multiple publisher systems, at least one advertiser, and a user's computer. The retargeting system provides retargeting information to the advertiser for storage on the user computer. The retargeting information may comprise identifiers for publisher systems authorized for retargeting and an advertiser identifier. The retargeting information may also receive user behavior information from publisher system visited by the user after visiting the advertiser's web site. The retargeting system may then transmit an advertisement corresponding to the advertiser identifier to the visited publisher system for presentation via the user computer if the visited publisher system is an authorized publisher system.

20 Claims, 7 Drawing Sheets

METHODS AND APPARATUS FOR ADVERTISING VIA COMPUTER NETWORKS AND WEBSITES

CROSS-REFERENCES TO RELATED APPLICATIONS

This application claims the benefit of U.S. Provisional Patent Application No. 60/891,995, filed Feb. 28, 2007, and incorporates the disclosure of the application by reference.

BACKGROUND OF INVENTION

Retargeting has emerged as an effective way of advertising via the Internet. Retargeting allows an advertiser to display an ad to a consumer after the consumer has left the advertiser's website. As the consumer proceeds to other websites, advertisements may be provided to the user by the advertiser on the other websites.

To retarget potential customers, an advertiser stores information on a user's computer in the form of a cookie to indicate that the user visited a particular page. For example, if the user accesses a page relating to a particular DVD player, the advertiser's website may place a cookie corresponding to the web page on the user's computer. When the user leaves the web page, the cookie remains on the user's computer.

The advertiser purchases ad space from a publisher or an ad network. When the user accesses a web page associated with the publisher or ad network, the cookie is read from the user's computer. The publisher or ad network may then select an ad to be shown to the user according to the cookie information. Thus, the publisher or ad network may present an ad for the previously viewed DVD player, which may be clicked by the user to return to the advertiser's web page to purchase the DVD player.

While retargeting can be quite effective, its reach is limited by the popularity of the publisher and/or size of the ad network. To reach more consumers, the advertiser contracts with multiple publishers and ad networks, increasing the cost and complexity of the retargeting. Use of multiple, unrelated publishers and ad networks, however, creates additional problems, such as reduced control, overlapping reach among publishers and ad networks, and "overselling" due to a user receiving multiple ads for the same item via different publishers and ad networks.

SUMMARY OF THE INVENTION

Methods and apparatus for advertising according to various aspects of the present invention operate in conjunction with a retargeting system, multiple publisher systems, at least one advertiser, and a user's computer. The retargeting system provides retargeting information to the advertiser for storage on the user computer. The retargeting information may comprise identifiers for publisher systems authorized for retargeting and an advertiser identifier. The retargeting information may also receive user behavior information from publisher system visited by the user after visiting the advertiser's web site. The retargeting system may then transmit an advertisement corresponding to the advertiser identifier to the visited publisher system for presentation via the user computer if the visited publisher system is an authorized publisher system.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various computers, networks, and servers, e.g., servers, databases, webservers, the Internet, local networks, and the like, which may carry out a variety of functions. In addition, the present invention may be practiced in conjunction with any number of networks, types of information, or participants, and the system described is merely one exemplary application for the invention. Further, the present invention may employ any number of conventional techniques for transferring data, presenting information, storing information, and the like.

Figure 1:
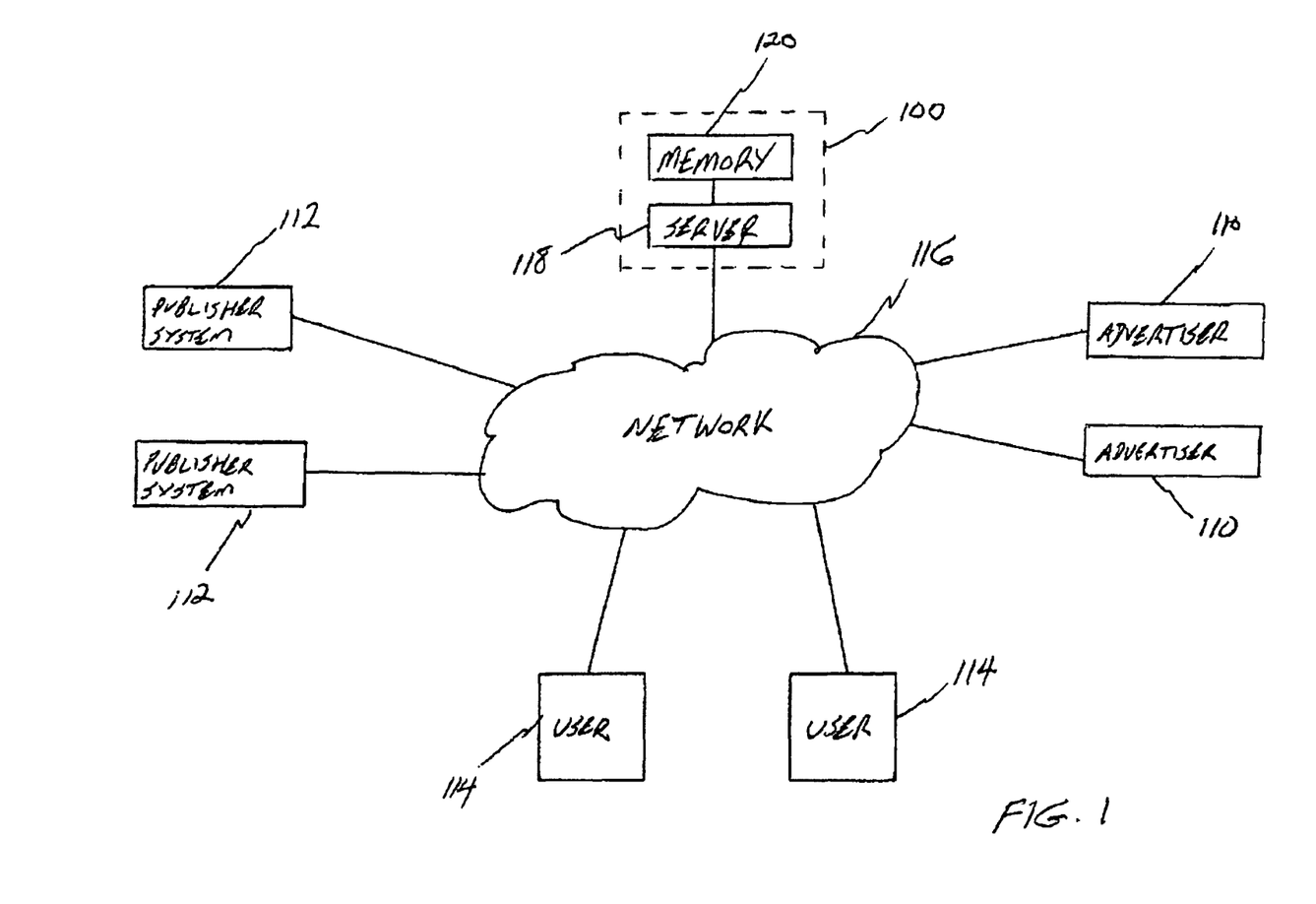
FIG. 1 is a block diagram of a system for advertising via computer networks.

Methods and apparatus for delivering information via computer networks according to various aspects of the present invention operate in conjunction with computers connected via a network, such as the Internet. The computer may deliver retargeted advertisements or other selected information to users via the network. Referring to FIG. 1, a retargeting system 100 according to various aspects of the present invention operates in conjunction with an advertiser 110 and a publisher system 112 connected via a network 116. The retargeting system 100 receives information for display to users 114 from the advertiser 110, and provides the information to users 114 via the publisher system 112 to retarget the users 114 according to selected criteria. Retargeting permits the advertiser 110 to display an ad to a user 114 after the user 114 has left the advertiser's 110 website, for example on other websites associated with the publisher systems 112. The present retargeting system 100 enables advertisers 110 to place retargeted ads to multiple users 114 across multiple publisher systems 112 through a single interface.

The advertisers 110 provide information to be viewed by the users 114. The advertisers 110 may comprise any appropriate systems or parties, such as political sources or vendors of commercial goods or services. Similarly, the information to be provided may comprise any suitable information, such as advertisements relating to goods or services or politically-oriented information. In the present embodiment, the information comprises advertisements encoded in an electronic format for transfer and presentation via the computer network 116.

The publisher system 112 receives the information and presents it to the user 114. The publisher system 112 may comprise any suitable systems for receiving the information and presenting it to the users 114. In one embodiment, the publisher systems 112 comprise commercial websites that present advertisements to users 114 in exchange for compensation. For example, the publisher system 112 may comprise search engines, Internet publications, electronic news outlets, commercial websites, personal websites, online matchmaking services, and the like. The publisher system 112 may also include any systems or elements for transferring the information to the user 114, such as a conventional ad server. In the present embodiment, the publisher systems 112 may include web content publishers, such as operations that publish information for consumption by users 114 on the Internet. The publisher systems 112 may also include ad networks, such as conventional ad networks or other information mediaries, that serve as agencies between groups of web sites or other web content publishers desiring to host advertisements and advertisers 110 or groups wishing to run advertisements on those sites.

The retargeting system 100 facilitates the transfer of information from the advertisers 110 to the users 114 via the publisher systems 112. The retargeting system 100 may comprise any suitable system for providing the advertiser 110 information to the publisher system 112, such as an automated system connected to the publisher systems 112 and the advertisers 110 through a medium like the Internet or other computer network 116. The retargeting system 100 may provide information to users 114 based on behavioral marketing concepts. The retargeting system 100 may target users 114 for marketing efforts according to their behavior, as opposed to by the content of information they receive via the computer network 116 system, for example based on clickstream data and IP information.

In particular, the retargeting system 100 may perform retargeting by observing a user 114's behavior while receiving information from the publisher systems 112 or advertisers 110, such as while visiting an advertiser's 110 website. The retargeting system 100 may then deliver targeted messages to the user 114 after the user 114 moves on to other subject matter, for example by visiting another publisher system's 112 website without buying a product at the original website.

The retargeting system 100 may comprise any suitable systems to perform the retargeting. For example, the retargeting system 100 may comprise a server 118 having access to a database in a memory 120, such as a conventional hard drive array, optical storage system, or the like. The server 118 communicates with the advertisers 110 and publisher systems 112 to set up the retargeting services and provide the retargeted information to the users 114 via the publisher systems 112. In the present embodiment, the server 118 provides the retargeting information to the advertiser 110 to be placed on the user 114's computer, receives behavior information regarding the user 114 from various publisher systems 112, and transmits advertisements or other information to the publisher systems 112 visited by the user 114 for presentation to the user 114. In addition, the server 118 may perform ancillary tasks, such as generating reports, invoices, and the like.

The database accessed by the server 118 and may store any suitable information, such as advertisements, information regarding the various publisher systems 112 including identifiers, advertiser 110 and publisher system 112 account information, reports, and the like. The retargeting system 100 suitably operates in conjunction with software stored on a medium to cause the server 118 and other components of the retargeting system 100 to operate.

The retargeting system 100 may provide retargeting according to any criteria, such as according to settings selected by multiple advertisers 110 and/or parameters set by the retargeting system 100. Further, the retargeting system 100 may deliver the information from the advertisers 110 to the users 114 via multiple unrelated publisher systems 112. Consequently, the retargeting system 100 can provide retargeting services to advertisers 110 across a broad range of networks and publishers through a single interface, such as an advertiser account interface provided to the advertiser 110 by the retargeting system 100. In addition, the retargeting system 100 can increase the effectiveness of the retargeting services, for example by controlling the frequency with which users 114 are exposed to particular information, such as an advertisement. The retargeting system 100 may also reduce the overall cost of the retargeting process, reach more potential customers through the multiple publisher systems 112, provide flexibility and ease of use to advertisers 110, and/or improve its efficiency.

To perform the retargeting operations, the retargeting system 100 may be configured according to parameters set by the advertisers 110, default settings, an administrator of the retargeting system 100, or other parties. For example, the retargeting system 100 may store and access information relating to one or more publisher systems 112 and advertisers 110. In one embodiment, the retargeting system 100 database includes information relating multiple publisher systems 112 that agree to provide post advertisements for the advertisers 110. The publisher systems 112 may be selected or otherwise associated with the retargeting system 100, for example via ownership, subscription, contract, or other relationship.

The publisher system 112 may provide advertising or other information transmission opportunities to the advertisers 110 via the retargeting system 100. The publisher system 112 may be configured to identify retargeting opportunities and deliver appropriate information. In the present embodiment, referring to FIG. 2, the operator of the retargeting system 100 may procure advertising space from the publisher systems 112 (210), such as by directly purchasing from a publisher, purchasing through an advertising network, or other appropriate methods. For Internet web advertising, the advertising purchases may be represented by ad tags generated by the publisher system 112 and provided to the retargeting system 100. The ad tags are unique for each publisher system 112, and may correspond to particular electronic publications, websites, and/or advertising locations, types, and/or sizes.

Figure 2:
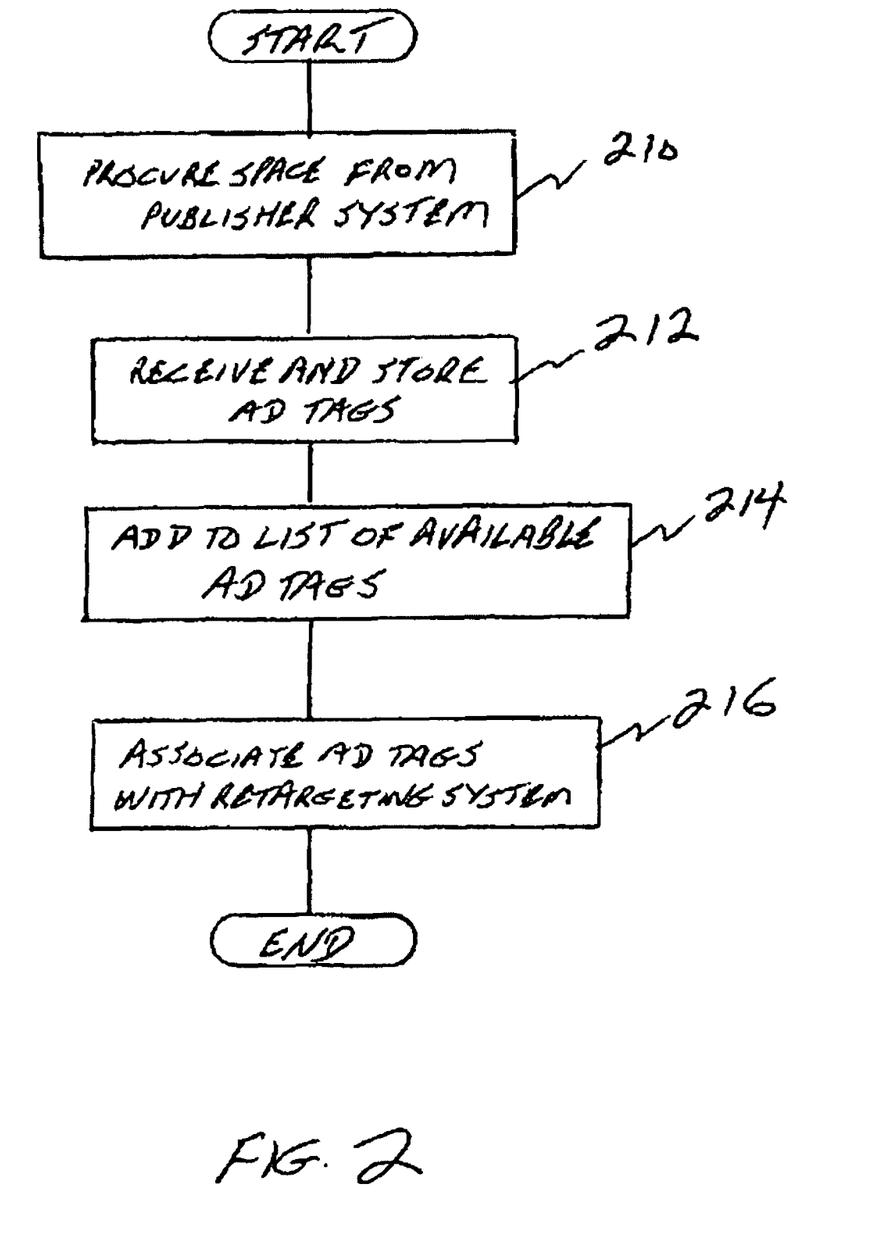
FIG. 2 is a flow chart of a publisher system setup process.

In the present embodiment, the ad tags comprise computer code, such as HTML code. Each ad tag may include any appropriate information, such as website information, ad types, and pixel data. For example, the ad tags may include the publisher system's 112 name, publisher system's 112 network ID, the ad type (e.g., skyscraper, popunders, etc.), an age or duration of the ad tag, and pricing information.

The retargeting database may store the ad tags and any other information, such as identification information for the various publisher systems 112, as well as terms and parameters for posting the advertisements (212). In the present embodiment, information relating to the publisher systems 112 is stored in the database and associated with a publisher system 112 ID for each publishing system. The publisher system 112 information may comprise any appropriate information, such as the name of the publisher or network, an identification code assigned to the publisher system 112, one or more ad tags associated with the publisher system 112, pricing terms and payment data, and the like. A unique network identifier may be assigned to each publisher system 112.

After purchasing ad tags from the various publisher systems 112, the retargeting system 100 may generate a list of publisher systems 112 available for advertising (214). For example, the retargeting system 100 may generate a list of all publisher systems 112 available for advertising, such as identification information for the networks, publications, and websites, available ad tags, pixel identifications, advertisement types, sizes, and locations, and pricing terms.

The publisher system 112 may also record the purchase or other association of the ad tags with the retargeting system 100 (216). For example, the publisher may note that an ad tag associated with a particular portion of a web page on a particular website has been purchased by the retargeting system 100, and implement a process for presenting information according to various parameters. For example, the publisher system 112 may note that when a user 114 visits a page, the publisher system 112 should read information from the user 114's computer, such as information associated with conventional cookies. The publisher system 112 may then present information to the user 114 according to the user 114 information, parameters set by the retargeting system 100, or other criteria, such as default settings in the event that no relevant user 114 information is available. The publisher system 112 may also be set to perform any other relevant tasks, such as tracking impressions upon users 114, click-through rates, and the like. To facilitate the retargeting process, the publisher system 112 may set up one or more accounts for the retargeting system 100 to record relevant information, such as contact information, retargeting processes and information, pricing information, and the like.

The advertisers 110 may use the retargeting system 100 to provide information to users 114 via the publisher systems 112. The advertisers 110 may provide the information to be presented to the users 114 and/or provide access to such information. The advertisers 110 may also provide parameters or settings for providing the information to the users 114.

Figure 3:
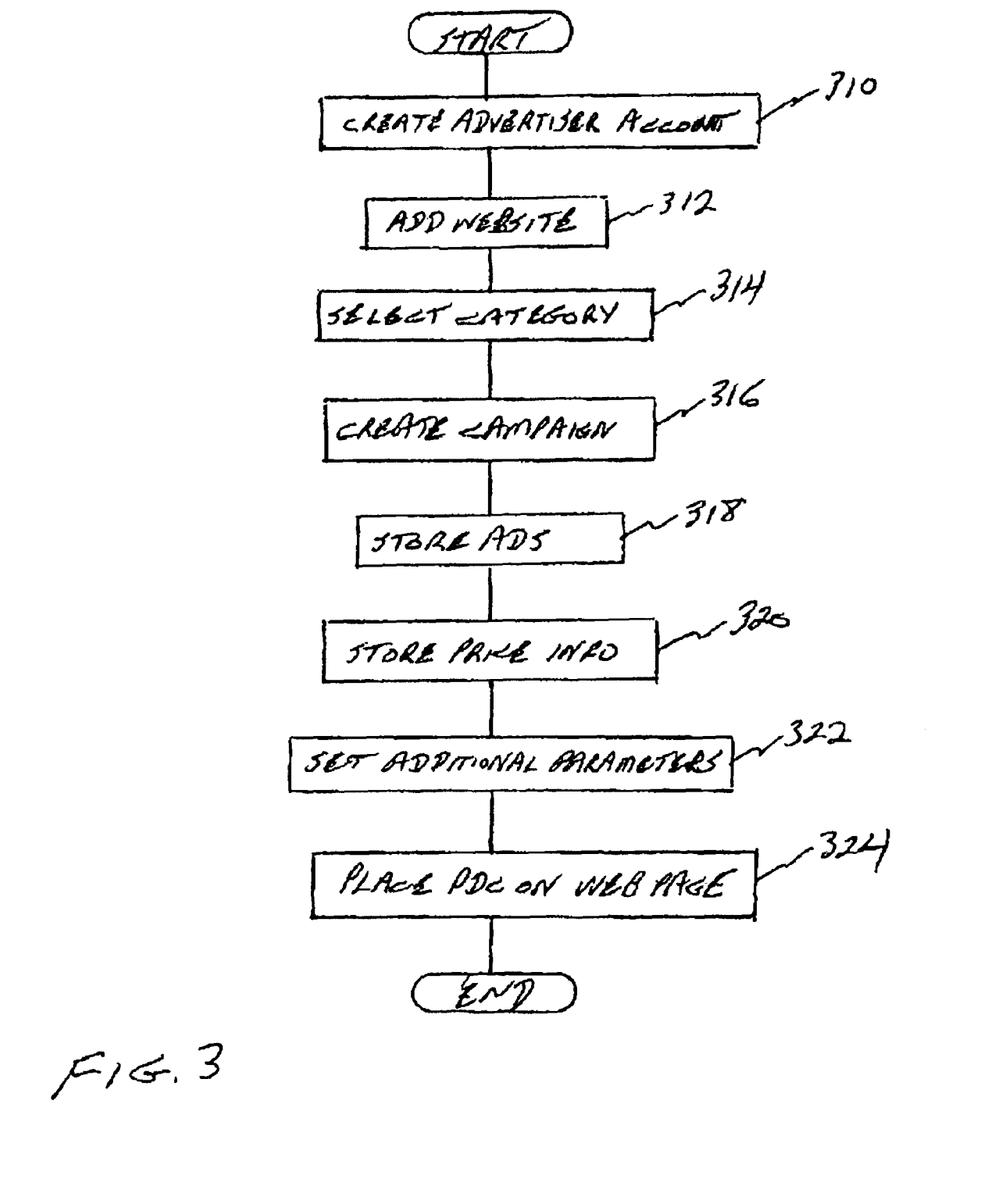
FIG. 3 is a flow chart of an advertiser setup process.

Referring to FIG. 3, the advertiser 110 may access an advertiser interface, such as a conventional web page associated with the retargeting system 100, to set up or adjust an account (310). Using information provided by the advertiser 110 or other parties, the retargeting system 100 may create an account for the advertiser 110. The account may include any appropriate information, such as information relating to the advertiser 110, the advertiser's 110 products or services, the information to be provided to users 114, an advertiser password, and/or payment information. The retargeting system 100 may provide data and/or tools for use by the advertiser 110, such as retargeting tools to identify users 114 that have visited the advertiser's 110 website and are to be selected for retargeting.

The retargeting system 100 may assign the advertiser 110 a user 114 name and a password to give the advertiser 110 access to electronic account systems for providing relevant data. The retargeting system 100 may request or require any relevant data to facilitate the retargeting and related tasks, such as advertiser company information, payment information like credit card numbers or bank transfer numbers and amounts, and categories of goods and services to be provided. The retargeting system 100 may also provide relevant data to the advertiser 110, such as balance information, retargeting and advertising reports and analyses, and account status.

The advertiser 110 may also set up advertising information and parameters. For example, the advertiser 110 may identify domain names and websites from which retargeting efforts are to be launched, set up advertising campaigns for retargeting, select types of advertisements, and/or select particular publisher systems 112 for advertising. The advertiser 110 may provide and/or the retargeting system 100 may request or require any appropriate information to implement the retargeting.

In one embodiment, the advertiser 110 provides information regarding the advertiser's 110 website from which the retargeting efforts are to be launched (312). For example, the advertiser 110 may identify one or more websites and/or webpages by URLs, and may select from one or more categories of users 114 that are to be visiting the URLs (314), such as users 114 shopping for pharmaceuticals, electronics, consumer goods, computer services, or the like. In the present embodiment, the advertiser 110 selects the appropriate category from a category tree for the website they want to retarget.

The advertiser 110 may also set up campaigns for the various offerings at the listed websites (316). For example, a website for electronics products may set up one campaign for a particular DVD player and another campaign for a personal media player. Each campaign may be associated with various advertisers 110, selections, parameters, or other settings. For example, the advertiser 110 may select desired types of ads, such as skyscraper, leaderboard, banners, etc. The advertiser 110 may also submit the information itself, such as to add or change an image to be used as the advertisement for each type of ad. Alternatively, the advertiser 110 may provide information for retrieving the information, such as a URL at the advertiser's 110 website for retrieving the information. In the present embodiment, the advertiser 110 provides an ad for each type of ad to be presented to users 114 for each product or service associated with the various campaigns and websites (318). The advertiser 110 may activate or deactivate the retargeting campaign as well via the advertiser interface.

Each campaign may also be associated with pricing information (320). For example, the retargeting system 100 may facilitate flat payments, provide a bid system among multiple advertisers 110 for showing information at a particular website or other location, list average click prices, or other payment information. Various payment options may be made available to the advertisers 110 by the retargeting system 100, and may vary according to any criteria, such as the size of the area, the page, publication, or publisher system 112 associated with a particular ad tag, the time of the presentation, or any other criteria or variables.

The retargeting system 100 may also store any other appropriate information (320). For example, different types of pages may be associated with different retargeting strategies. For example, a default "landing page" for a campaign may be configured to retarget users 114 to purchase a particular product. A "success page", corresponding to a user 114 purchasing the particular product, may be configured to retarget users 114 to purchase related products, such as accessories or improvements. The retargeting system 100 may provide a default setting to exclude retargeting of products that are associated with "success" page information on the user 114's computer, for example to avoid showing an ad for a product that has already been sold to the user 114. Instead, the retargeting system 100 may provide a different ad, such as for a related product or an improvement.

The advertiser 110 may also provide any other information relating to the campaigns. For example, the advertiser 110 may request a list of all available ad tags, such as by publisher system 112 and ad unit and with corresponding prices, like average "click prices". The advertiser 110 may then select which publisher systems 112, such as particular ad networks and publications, on which to advertise, with what type of ad campaigns, and/or how many times to show a particular user 114 a particular ad. The advertiser 110 may also make selections according to available ad units. For example, the retargeting system 100 may not show skyscraper units if the advertiser 110 has not purchased any skyscraper ads. The retargeting system 100 may list all available ad tags by network and ad unit, or may limit the type of ad tags according to criteria selected by the advertiser 110.

In addition, the advertiser 110 may provide frequency capping parameters, for example to restrict the number of times a particular user 114 is shown a particular ad, either overall or within a selected time period. The present retargeting system 100 permits the advertiser 110 to control the frequency with which a user 114 is presented with the same information via multiple publisher systems 112. Further, the advertiser 110 may request reports regarding the campaign, such as total cost of the campaign, total clicks by day per ad campaign, average cost per click, total conversions (whether a click resulted in a lead, sale, purchase, etc), total cost of conversions, and the like. The reports can provide information in any manner, such as by ad tag, website, or campaign.

The retargeting system 100 may also provide retargeting information and/or tools to the advertiser 110 to track users 114 for retargeting purposes. The retargeting information and/or tools may perform any appropriate tasks and include any appropriate information, such as identifying users 114 that visit any publisher system 112 associated with the retargeting system 100 after visiting the advertiser's 110 website. The retargeting information and/or tools may further indicate which product, service, or the like was previously viewed by the user 114, whether the user 114 purchased the viewed subject matter, how long ago the user 114 viewed the advertiser's 110 website, or any other information to facilitate retargeting the user 114.

In one embodiment, the retargeting system 100 provides retargeting information including computer code configured to place information on a user 114's computer to indicate that the user 114 visited the particular web page. For example, the retargeting system 100 may provide one or more pixel drop codes (PDCs) to the advertiser 110 for each campaign to be placed on the advertiser's 110 web pages (324). The PDC places information on a user 114's computer upon visiting a website. The PDC may be given a name, such as the name of the associated campaign, and may be encrypted to ensure security. The PDC may comprise include data unique to the retargeting system 100, such as including an identifier for the retargeting system 100, a unique identifier corresponding to the web site on which the PDC is placed, and/or any other appropriate components and data.

For example, each PDC may have an advertiser identifier corresponding to the advertiser 110, a product or service offered by the advertiser 110, a web page of the advertiser 110, or other identifier indicating that the user 114 computer received information relating to the advertiser 110. In one embodiment, the advertiser identifier includes a name associated with a particular campaign and/or web page, and may be configured to place a "cookie" or other data file on a user 114's computer. The cookie includes data referring to the retargeting system 100 and the advertiser 110, such that when the cookie is identified by a publisher system 112, the publisher system 112 may recognize the cookie as being associated with the retargeting system 100, and contact the retargeting system 100 to retrieve the proper information to be provided to the user 114 according to the data and parameters for the particular advertiser 110.

After the advertiser 110 has set up the various campaigns on the retargeting system 100 and placed the PDCs from the retargeting system 100 on the appropriate webpages, users 114 may be retargeted via the retargeting system 100. Generally, the user 114 visits the advertiser's 110 website, and the PDC places information on the user 114's computer, indicating which information was viewed by the user 114 at the advertiser's 110 website, along with which publisher systems 112 should respond to the data placed by the PDC. The user 114 may then leave the advertiser's 110 website, either with or without making a purchase or otherwise successfully performing a transaction.

When the user 114 visits a website connected with one of the publisher systems 112 associated with the retargeting system 100, the publisher system 112 may determine whether it is among the publisher systems 112 selected by the advertiser 110 to respond to data placed by the PDC and proceed with retargeting. If so, the publisher system 112 may notify the retargeting system 100, which may provide the retargeted information to the publisher system 112 for presentation to the user 114.

Figure 4:
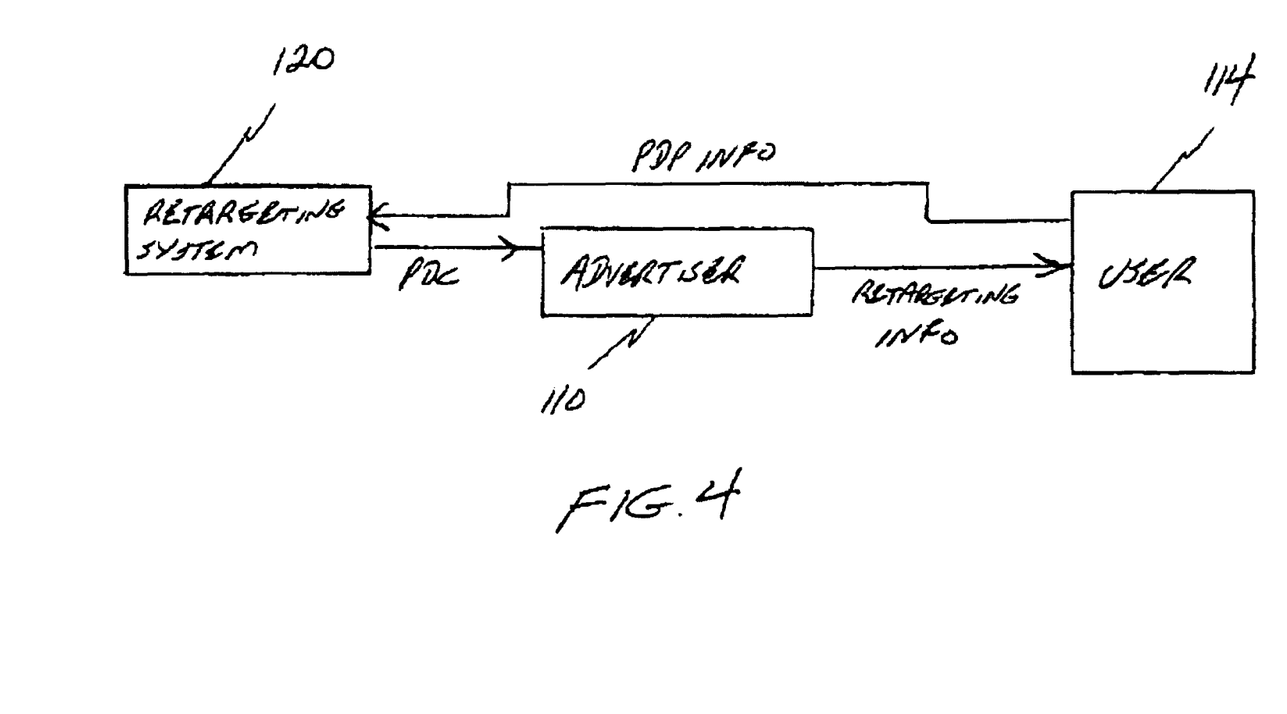
FIG. 4 is a block diagram of retargeting information being placed on a user computer.
Figure 5:
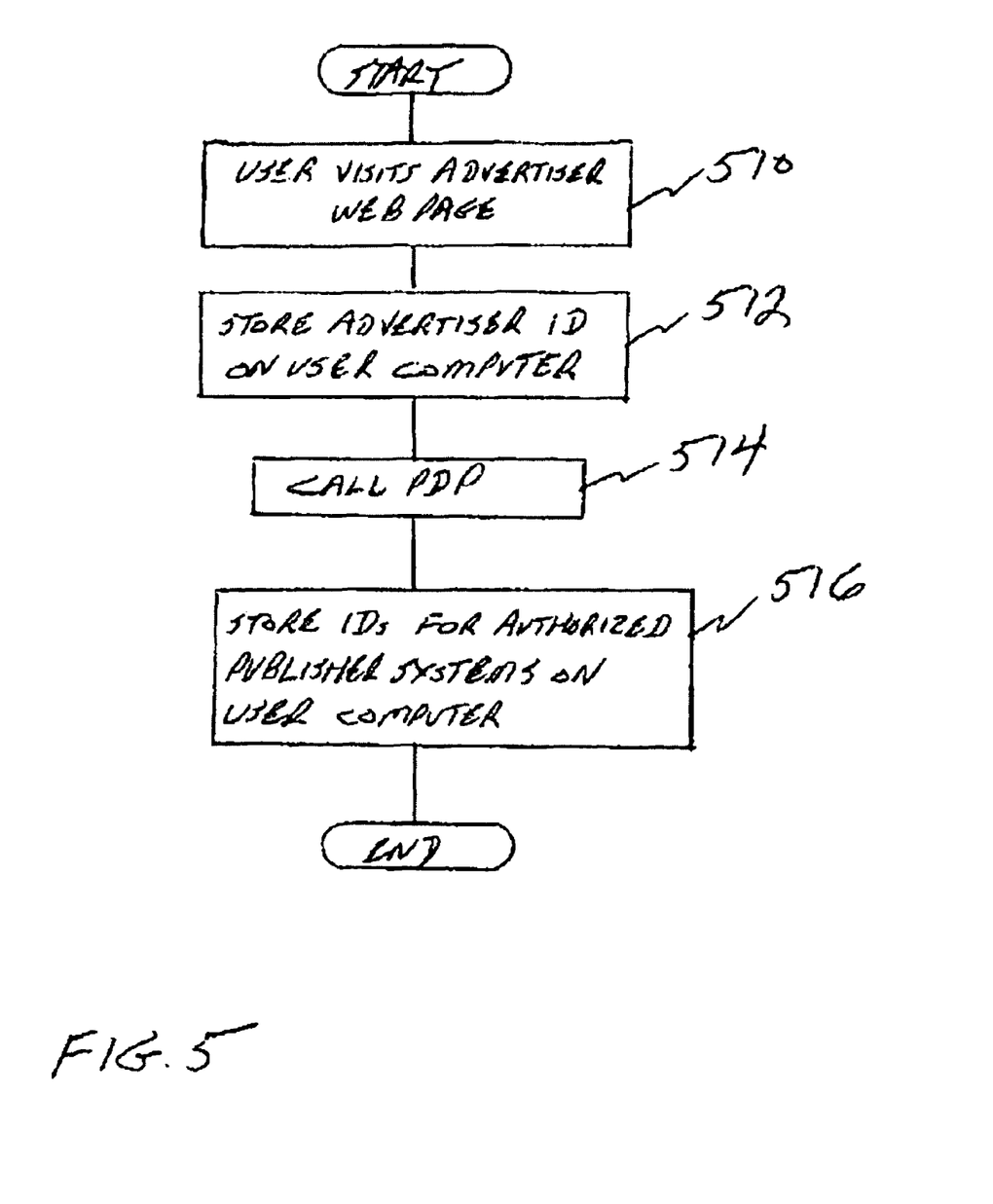
FIG. 5 is a flow chart of a process for placing retargeting information on the user computer.

Referring to FIGS. 4 and 5, for example, the user 114 may initially arrive at the advertiser's 110 website and view various products (510). When the user 114 downloads a page containing a PDC from the retargeting system 100, the PDC places retargeting information, such as the advertiser identifier in the form of a cookie or other data, on the user 114's computer (512). In the present embodiment, the cookie comprises an encrypted text file, and may include any suitable information, such as a website identifier corresponding to the web page visited by the user 114, a retargeting system 100 identifier, and various other data, such as data corresponding to the selections and parameters provided by the advertiser 110 relating to the campaign and other parameters set by the retargeting system 100.

The PDC may place the information on the user 114's computer in any suitable manner. For example, the PDC may comprise computer code to cause the user 114's computer to download information from another source, such as by calling a pixel drop page (PDP) associated with the retargeting system 100 (514). The PDP may reside on the retargeting system's 100 server 118, and may contain data provided by or relating to the various publisher systems 112, such as network pixels corresponding to each publisher system 112 associated with the retargeting system 100. The PDP may receive an identifier for the PDC that called the PDP, which corresponds to a database entry for the campaign and website associated with the PDC.

The retargeting system 100 may check the database for information to be provided to the user 114's computer, such as which publisher systems 112 have been selected to respond to perform retargeting for the advertiser 110 via the retargeting system 100. The retargeting system 100 may then provide identification information for those publisher systems 112 authorized by the advertiser 110 to provide retargeting on users 114 visiting the advertiser's 110 web pages (516). Thus, the retargeting system 100 may include or exclude a particular publishing system's network pixel according to the information in the database regarding which publisher systems 112 were selected by the advertiser 110 to participate in the advertiser's 110 retargeting campaign.

The identities of the selected publisher systems 112, such as a set of network identifiers, may be placed on the user 114's computer, along with any other data selected by the advertiser 110 and/or the retargeting system 100, such as the advertiser category selected by the advertiser 110, a website identifier, the PDC name, the type of PDC (like a "landing" or "success"

PDC), the date the cookie was added, click-through rate information, an advertiser account identifier, a campaign identifier, an advertisement identifier, and/or any other desired or appropriate information. In the present embodiment, the PDC uses the information from the PDP to set the network pixels provided by the publisher systems 112 selected for participation by the advertiser 110 on the user 114's computer. For example, the cookie information may include the advertiser category, the website ID for the website placing the cookie information, the PDC name (including whether the page is a "landing" page, "success" page, or the like), the date the cookie information was added to the user 114's computer, click-through rate information, the advertiser account ID, the advertiser campaign ID, the ad ID, or other suitable information selected by the advertiser 110 and/or retargeting system 100.

Placing the information on the user 114's computer facilitates tracking the pages viewed by user 114 or other actions for retargeting. The user 114's action may be tracked in any appropriate manner, however, such as by saving the information and a user 114 identifier in the retargeting system 100 database to determine the user 114's interactions with the advertisers 110 and the publisher systems 112.

More particularly, the PDCs associated with each of the web pages associated with the advertiser 110 place information on the user 114's computer, including information relating to which publisher systems 112 have been selected to perform retargeting. Eventually, referring to FIGS. 6 and 7, the user 114 may leave the advertiser's 110 web page and move to other websites (710). If another website later visited by the user 114 is associated with one of the publisher systems 112 from which the retargeting system 100 has acquired retargeting space, the publisher system 112 may retrieve the information placed by the advertiser 110 on the user 114's computer. If the publisher system 112 is one of those named to participate in the retargeting, the publisher system 112 may retrieve an ad or other information associated with at least one of the advertiser 110 web pages visited by the user 114 from the retargeting system 100 and present it to the user 114. The ad may be presented according to criteria set by the advertiser 110, the retargeting system 100, and/or the publisher system 112.

Figure 6:
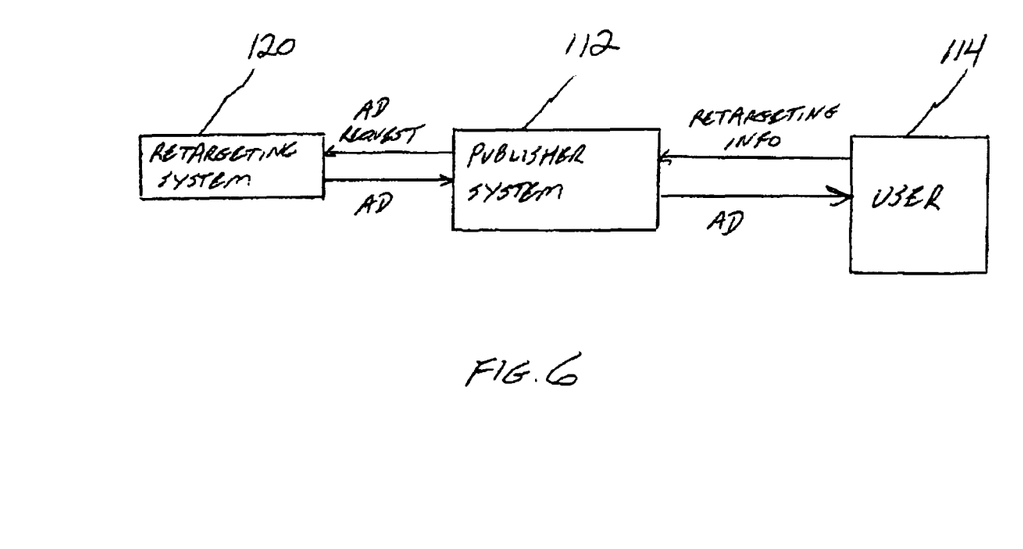
FIG. 6 is a block diagram of providing retargeted information to the user computer.
Figure 7:
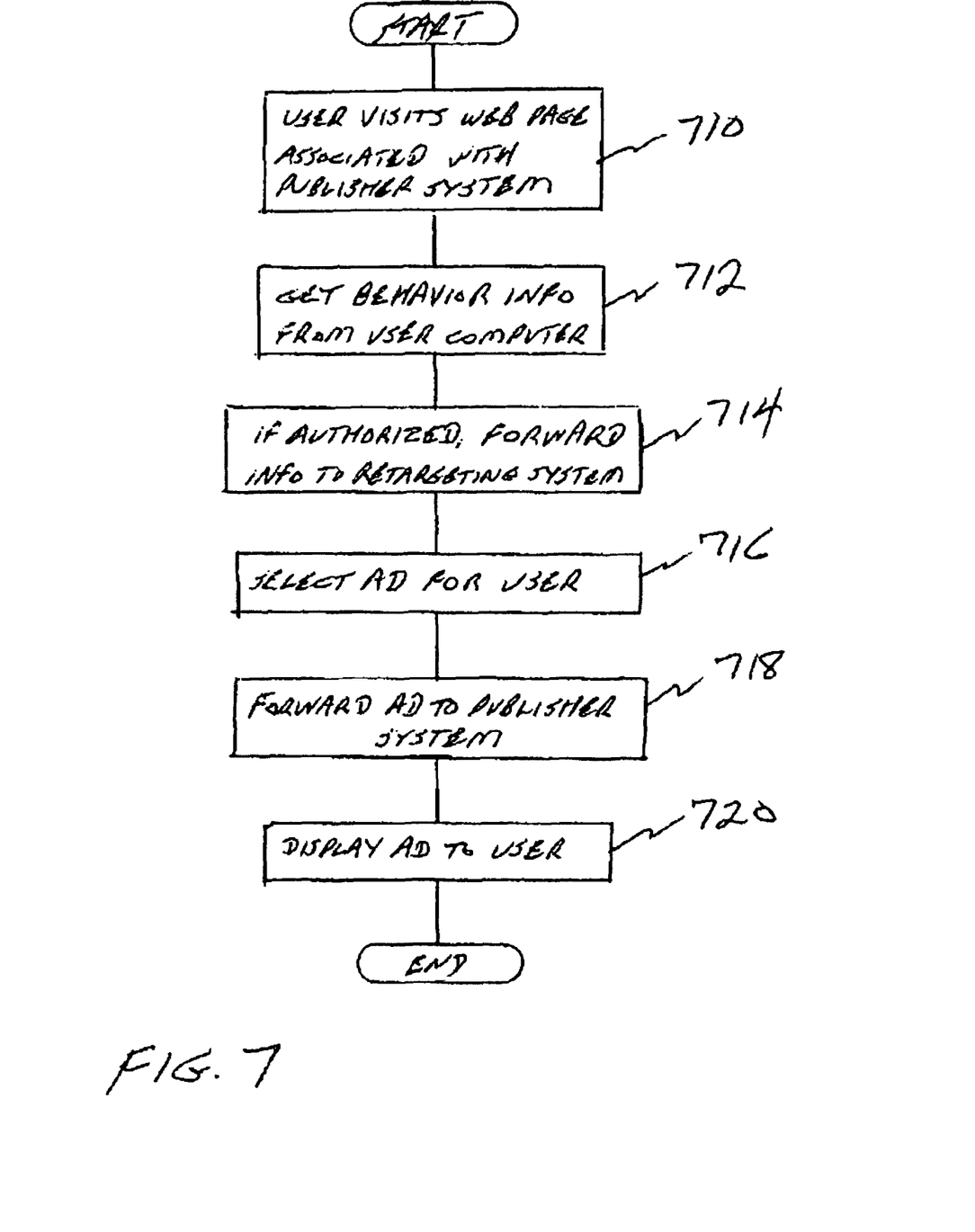
FIG. 7 is a flow chart of a process for providing retargeted information to the user.

In the present embodiment, the publisher system 112 may check the user 114's computer for user 114 behavior information, including the retargeting information placed by the advertiser's 110 web page, for example using conventional cookie-retrieval methods (712). If the publisher system 112 recognizes the user 114 behavior information as including retargeting information, such as a cookie from the retargeting system 100, and if the retrieved information indicates that the publisher system 112 is among the publisher systems 112 selected by the advertiser 110 to perform retargeting, the publisher system 112 contacts the retargeting system 100 with the information from the user 114's computer (714). The publisher system 112 may provide user 114 behavior information, as well as information regarding the publisher system 112, such as a publisher system 112 identifier, to facilitate tracking the retargeting services provided by the publisher system 112. In the present embodiment, the publisher system 112 provides the ad category, website ID, PDC name, the date the cookie was added, the advertiser campaign ID, and the ad ID retrieved from the user 114's computer.

The information retrieved from the user 114's computer and received from the publisher system 112 may be processed by the retargeting system 100 to retarget the user 114 according to the user 114's prior viewing of the advertiser's 110 web pages. Based on the information from the user 114's computer and/or the information from the publisher system 112, the retargeting system 100 of the present embodiment may identify an appropriate ad or other information to be provided to the user 114 via the publisher system 112 (716). For example, the retargeting system 100 may determine that the publisher system 112 has an ad tag for a banner ad available, and that the user 114 previously viewed a particular DVD player on the advertiser's 110 website. The retargeting system 100 may then select a banner ad from the relevant advertiser 110 for the DVD player from the database and provide the banner ad to the publisher system 112 for presentation to the user 114.

If multiple candidate ads are available, the retargeting system 100 may implement a set of preselected criteria to select which ad to provide to the publisher system 112. For example, the user 114 might have visited three different sites of three different advertisers 110, and only one ad tag may be available for presenting a retargeted ad to the user 114. The retargeting system 100 may select an advertiser 110 and ad to be presented according to the ad selection criteria. The ad selection criteria may relate to any appropriate criteria, such as the most recent web page visited by the user 114 or a priority set by the advertiser 110, a bidding scheme, a priority in time, a predetermined hierarchy, or the like.

For example, the retargeting system 100 may first identify the type of user 114 according to the user 114 category identified in the cookie information. The retargeting system 100 may then identify all campaigns that match the category, excluding those that do not qualify, such as those campaigns that are not adequately funded, campaigns that do not include the proper ad type for the available ad tag, campaigns that have met a frequency cap, or campaigns associated with a "success" page cookie, indicating that the user 114 has already purchased the product. If the user 114 belongs to multiple categories, the retargeting system 100 can select the ad according to selected arbitration criteria, such as the most recent user 114 activity. Thus, a user 114 may belong to both a flowers group and a mortgage group. If the user 114 was shopping for flowers yesterday and mortgages last week, the retargeting system 100 may elect to select a flowers ad for presentation to the user 114.

Likewise, if multiple campaigns are available within the user 114's category, the retargeting system 100 may select the campaign where the website ID owner is same as the one who created cookie record match. Thus, if www.advertiser.com set the retargeted information, then ads from that advertiser 110 will have priority. Similarly, if there are multiple matches, the retargeting system 100 may select an ad corresponding to the most recent match. If the website ID has multiple campaign matches, the retargeting system 100 may select the campaign with the highest ECPM (effective cost per thousand). If the ECPMs are even or unavailable, the retargeting system 100 may select the ad at random. If the website ID owner does not have a valid campaign, the retargeting system 100 may select the campaign with the highest ECPM. If there are multiple ads available, the ads may be rotated. Further, after a selected number of impressions have been delivered for each ad, the retargeting system 100 may select the one with the highest CTR. Any appropriate selection criteria, however, may be applied.

The retargeting system 100 may then send the selected ad for the selected advertiser 110 to the publisher system 112 (718). The retargeting system 100 may also store the information received from the publisher system 112, including the publisher system 112 identifier, and information regarding the response provided by the retargeting system 100. The retargeting system 100 may also charge the advertiser's 110 account, for example on an hourly basis. In the present embodiment, the retargeting system 100 determine CPM cost for traffic (via ad tag data) for each ad tag that has been delivered during that hour and determine clicks on the presented ads. Each advertiser account may have a margin percentage entered into its account. As a default setting, every account may include a 200% percentage. The retargeting system 100 determines total cost by multiplying the fee charged by the publisher system 112 by the margin percentage for that account. Thus, if the total cost for the traffic during the hour for one ad tag is $10, the 200% margin percentage results in a charge of $20 to the advertiser 110. If the total clicks on the ad were 10, the cost per click is $2.00.

The publisher system 112 receives the ad and displays the ad to the user 114 (720). The publisher system 112 may note that the ad was presented and provide a confirmation to the retargeting system 100. This information may be used to charge the retargeting system 100 for the services provided. The publisher system 112 may also note and/or transfer to the retargeting system 100 any appropriate information, such as whether the user 114 acted upon presentation of the ad by clicking on it. The retargeting system 100 may store information relating to the retargeting process, such as which ads were presented to which users 114, the publishing systems that presented the ads, the costs associated with the retargeting, which ads led to further action like a sale or lead, the types of ads presented, and the frequency with which ads were presented to particular users 114.

The retargeting system 100 may also include a reporting system for reporting information and results, such as for data tracking and settling accounts. For example, the retargeting system 100 may store information relating to the retargeting services provided by the publisher system 112, such as the number of impressions of each ad provided by the publisher system 112 to users 114, the number of clicks by users 114 on those ads, and the like. The retargeting system 100 may organize the information in any suitable manner, such as by advertiser 110, advertisement, ad tag, ad type, or campaign. The retargeting system 100 and/or the advertiser 110 may compensate the publisher system 112 as well, such as on a per impression basis or a click-through rate basis. The reporting system may generate the appropriate reports for operating with the various publisher systems 112, such as to support the amounts owed to the publisher systems 112 for the provided services.

In addition, the reporting system may organize and report information relating to the advertisers 110, such as to track operations and support invoicing. For example, the advertiser 110 may have limited access to the reporting system to receive selected information. In the present embodiment, the advertiser 110 may request information regarding performance over selected date ranges, by ad tag, by website, by campaign, by publisher system 112, or according to other suitable parameters. The reporting system may generate charts, total amounts spent or owing, total clicks by day per ad campaign, average cost per click, total conversions (whether click resulted in lead, sale, purchase, etc), total cost of conversions, prepaid amounts left in the advertiser's 110 account, amounts paid to the publisher systems 112, or other relevant information. The reporting system may also reflect amounts paid or owing to the retargeting system 100, such as on a per click basis, a click-through rate basis, or a multiplier of rate charged by the publisher systems 112.

In the foregoing specification, the invention has been described with reference to specific exemplary embodiments. Various modifications and changes may be made without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any appropriate order and are not limited to the specific order presented in the claims. Additionally, the components and/or elements recited in any apparatus claims may be assembled or otherwise operationally configured in a variety of permutations and are accordingly not limited to the specific configuration recited in the specification and shown in the drawings.

Benefits, advantages, and solutions to problems have been described above with regard to particular embodiments. Any benefit, advantage, solution to problem or any element that may cause any particular benefit, advantage or solution to occur or to become more pronounced are not to be construed as critical, required or essential features or components of any or all the claims.

As used in this description, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the invention.

The invention claimed is:

1. A computer-implemented method of facilitating advertising for an advertiser via a user computer and multiple publisher systems, comprising:
   providing retargeting information to the advertiser, wherein the retargeting information is adapted to be stored on the user computer, and wherein the retargeting information comprises:
   multiple identifiers for multiple publisher systems authorized by the advertiser for retargeting; and
   an advertiser identifier configured to identify the advertiser;
   receiving from a visited publisher system user behavior information retrieved from the user computer, wherein the user behavior information includes the advertiser identifier; and
   transmitting an advertisement to the visited publisher system only when the visited publisher system is one of the authorized publisher systems, wherein the advertisement corresponds to the advertiser identifier and is adapted for presentation via the user computer.

2. A computer-implemented method of facilitating advertising according to claim 1, wherein the retargeting information comprises computer code configured to request the multiple publisher system identifiers from a remote retargeting system.

3. A computer-implemented method of facilitating advertising according to claim 1, further comprising comparing an identifier for the visited publisher system to the identifiers for the authorized publisher systems.

4. A computer-implemented method of facilitating advertising according to claim 1, further comprising selecting the advertisement corresponding to the advertiser identifier according to a number of times the advertisement has been presented to the user computer via the multiple publisher systems.

5. A computer-implemented method of facilitating advertising according to claim 1, wherein the multiple publisher systems comprise at least two unrelated ad networks.

6. A computer system for facilitating advertising for an advertiser via a user computer and multiple publisher systems, wherein the computer system comprises:
a memory; and
a processor configured to:
access the memory;
provide retargeting information to the advertiser, wherein the retargeting information is adapted to be stored on the user computer, and wherein the retargeting information comprises:
multiple identifiers for multiple publisher systems authorized by the advertiser for retargeting; and
an advertiser identifier configured to identify the advertiser;
receive from a visited publisher system user behavior information retrieved from the user computer, wherein the user behavior information includes the advertiser identifier; and
transmit an advertisement to the visited publisher system only when the visited publisher system is one of the authorized publisher systems, wherein the advertisement corresponds to the advertiser identifier and is adapted for presentation via the user computer.

7. A computer system according to claim 6, wherein the memory stores:
the identifiers for the multiple authorized publisher systems; and
the advertisement; and
the processor comprises a server coupled to the memory, wherein the server is configured to provide the retargeting information to the advertiser, receive the user behavior information, and transmit the advertisement to the visited publisher system.

8. A computer system according to claim 6, wherein the retargeting information comprises computer code configured to request the multiple publisher system identifiers from the memory.

9. A computer system according to claim 6, wherein the processor is further configured to compare all identifier for the visited publisher system to the identifiers for the authorized publisher systems.

10. A computer system according to claim 6, wherein the processor is further configured to select the advertisement corresponding to the advertiser identifier according to a number of times the advertisement has been presented to the user computer via the multiple publisher systems.

11. A computer system according to claim 6, wherein the multiple publisher systems comprise at least two unrelated ad networks.

12. A non-transitory medium storing instructions for causing a computer to implement a process for facilitating advertising for an advertiser via a user computer and multiple publisher systems, the process comprising:
providing retargeting information to the advertiser, wherein the retargeting information is adapted to be stored on the user computer, and wherein the retargeting information comprises:
multiple identifiers for multiple publisher systems authorized by the advertiser for retargeting; and
an advertiser identifier configured to identify the advertiser;
receiving from a visited publisher system user behavior information retrieved from the user computer, wherein the user behavior information includes the advertiser identifier; and
transmitting an advertisement to the visited publisher system via the user computer only when the visited publisher system is one of the authorized publisher systems, wherein the advertisement corresponds to the advertiser identifier and is adapted for presentation via the user computer.

13. A non-transitory medium according to claim 12, wherein the retargeting information comprises computer code configured to request the multiple publisher system identifiers from a remote retargeting system.

14. A non-transitory medium according to claim 12, further comprising comparing an identifier for the visited publisher system to the identifiers for the authorized publisher systems.

15. A non-transitory medium according to claim 12, further comprising selecting the advertisement corresponding to the advertiser identifier according to a number of times the advertisement has been presented to the user computer via the multiple publisher systems.

16. A non-transitory medium according to claim 12, wherein the multiple publisher systems comprise at least two unrelated ad networks.

17. A computer-implemented method of facilitating advertising for an advertiser via a user computer and multiple ad networks, comprising:
providing a computer code to the advertiser, wherein the computer code is adapted to be stored on the user computer via a web page controlled by the advertiser, and wherein the computer code comprises:
multiple identifiers for multiple ad networks authorized by the advertiser to perform retargeting for the advertiser; and
an advertising identifier corresponding to the web page controlled by the advertiser;
receiving from at least one of the authorized ad networks the advertising identifier retrieved from the user computer; and
transmitting an advertisement to the at least one of the authorized ad networks for presentation via the user computer, wherein the advertisement corresponds to the advertising identifier and is adapted for presentation via the user computer.

18. A computer-implemented method of facilitating advertising according to claim 17, wherein the computer code is configured to cause the user computer to request the multiple ad network identifiers from a remote retargeting system.

19. A computer-implemented method of facilitating advertising according to claim 17, further comprising comparing an identifier for the at least one of the authorized ad networks to the identifiers for the multiple ad networks.

20. A computer-implemented method of facilitating advertising according to claim 17, further comprising selecting the advertisement corresponding to the advertising identifier according to a number of times the advertisement has been presented to the user computer via the multiple ad networks.

* * * * *

UNITED STATES PATENT AND TRADEMARK OFFICE
CERTIFICATE OF CORRECTION

| | | |
|---|---|---|
| PATENT NO. | : 8,671,016 B2 | Page 1 of 1 |
| APPLICATION NO. | : 12/039449 | |
| DATED | : March 11, 2014 | |
| INVENTOR(S) | : Little | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1256 days.

Signed and Sealed this
Twenty-third Day of June, 2015

Michelle K. Lee
*Director of the United States Patent and Trademark Office*